US007809386B2

(12) United States Patent
Stirbu

(10) Patent No.: US 7,809,386 B2
(45) Date of Patent: Oct. 5, 2010

(54) LOCAL NETWORK PROXY FOR A REMOTELY CONNECTED MOBILE DEVICE OPERATING IN REDUCED POWER MODE

(75) Inventor: Vlad Stirbu, Tampere (FI)

(73) Assignee: Nokia Corporation, Espoo (FI)

( * ) Notice: Subject to any disclaimer, the term of this patent is extended or adjusted under 35 U.S.C. 154(b) by 1034 days.

(21) Appl. No.: 11/170,724

(22) Filed: Jun. 29, 2005

(65) Prior Publication Data
US 2007/0004436 A1    Jan. 4, 2007

(51) Int. Cl.
H04B 15/00    (2006.01)
(52) U.S. Cl. .................... 455/503; 455/502; 455/452.2; 455/522; 455/41.2; 370/328; 370/338
(58) Field of Classification Search ................. 455/503, 455/41.2, 452.1, 452.2, 502, 522; 370/254, 370/328, 338, 477; 707/102; 726/12; 709/225
See application file for complete search history.

(56) References Cited

U.S. PATENT DOCUMENTS

| 5,999,530 | A | 12/1999 | LeMaire et al. |
| 6,571,277 | B1 | 5/2003 | Daniels-Barnes et al. |
| 6,721,290 | B1 | 4/2004 | Kondylis et al. |
| 2002/0152299 | A1 | 10/2002 | Traversat et al. |
| 2003/0084191 | A1 | 5/2003 | Yamamoto |
| 2004/0120301 | A1 | 6/2004 | Kitchin |
| 2004/0128310 | A1* | 7/2004 | Zmudzinski et al. ........ 707/102 |
| 2004/0186897 | A1 | 9/2004 | Knauerhase et al. |
| 2004/0233930 | A1* | 11/2004 | Colby, Jr. .................... 370/464 |
| 2005/0044430 | A1 | 2/2005 | Cheshire |
| 2005/0135269 | A1 | 6/2005 | Saint-Hilaire et al. |
| 2005/0135286 | A1* | 6/2005 | Nurminen et al. ........... 370/310 |
| 2005/0204065 | A1 | 9/2005 | Son et al. |
| 2006/0002320 | A1 | 1/2006 | Costa-Requena |
| 2006/0087993 | A1* | 4/2006 | Sengupta et al. ............ 370/310 |

(Continued)

FOREIGN PATENT DOCUMENTS

WO    WO2004010305    1/2004

(Continued)

OTHER PUBLICATIONS

Ulhas Warder, Mark Yoshitake and Karel Van Doorselaer, WLAN Access Point Device:1pp. 1-15, Oct. 17, 2003.

(Continued)

*Primary Examiner*—Matthew D Anderson
*Assistant Examiner*—Shaima Q Aminzay
(74) *Attorney, Agent, or Firm*—Hollingsworth & Funk, LLC

(57) ABSTRACT

A mobile device is coupled to an ad-hoc, peer-to-peer local area network via a public network. A secure data connection is created between the mobile device and an access point of the local area network so that the mobile device operates in an address space of the local network. A proxy for the mobile device is operated on the local network. The proxy maintains one or more state variables related to operation of the mobile device on the local network. The proxy simulates a reduced power mode of the mobile device on the local network for purposes of shaping traffic over the secure data connection and provides the state variables to entities of the local network on behalf of the mobile device.

38 Claims, 6 Drawing Sheets

U.S. PATENT DOCUMENTS

2006/0168126 A1     7/2006    Costa-Requena et al.
2007/0078959 A1     4/2007    Ye

FOREIGN PATENT DOCUMENTS

WO      WO2005020505      3/2005

OTHER PUBLICATIONS

Sinha, KyungJu, Liong, Ye, Costa-Requena, McGee, Heerink, Guidi and Fairman, UPnP™ Power Management, pp. 1-31, Mar. 22, 2005.
Matthew Schmitz, Ulhas Warrier, and Prakash Iyer, WANIPConnection:1 Service Template Version 1.01, pp. 1-74, Nov. 12, 2001.
Klamra et al., "Design and Evaluation of Power Management Support for UPnP Devices", Jun. 10, 2005.
Office Action dated Jan. 28, 2008 from U.S. Appl. No. 11/242,102, 32 pages, Nov. 28, 2008.
Office Action dated Jun. 16, 2009 from U.S. Appl. No. 11/242,102, 26 pages.
Office Action dated Sep. 28, 2009 from U.S. Appl. No. 11/242,102, 38 pages.
Office Action Response dated Mar. 19, 2009 from U.S. Appl. No. 11/242,102, 17 pages.
Office Action Response dated Aug. 6, 2009 from U.S. Appl. No. 11/242,102, 19 pages.
Office Action Response dated Dec. 30, 2009 from U.S. Appl. No. 11/242,102, 20 pages.
Office Action dated Mar. 30, 2010 from U.S. Appl. No. 11/242,102, 32 pages.
Appeal Brief dated Mar. 11, 2010 from U.S. Appl. No. 10/884,811, 35 pages.
Office Action dated Oct. 9, 2009 from U.S. Appl. No. 10/884,811, 14 pages.
Office Action Response dated Aug. 4, 2009 from U.S. Appl. No. 10/884,811, 13 pages.
Office Action dated Apr. 13, 2009 from U.S. Appl. No. 10/884,811, 13 pages.
Office Action Response dated Feb. 23, 2009 from U.S. Appl. No. 10/884,811, 15 pages.
Office Action dated Nov. 21, 2008 from U.S. Appl. No. 10/884,811, 13 pages.
Office Action Response dated Sep. 18, 2008 from U.S. Appl. No. 10/884,811, 11 pages.
Office Action dated May 28, 2008 from U.S. Appl. No. 10/884,811, 10 pages.
Office Action Response dated Apr. 3, 2008 from U.S. Appl. No. 10/884,811, 13 pages.
Office Action dated Jan. 22, 2008 from U.S. Appl. No. 10/884,811, 10 pages.
Office Action Response dated Nov. 15, 2007 from U.S. Appl. No. 10/884,811, 11 pages.
Office Action dated Aug. 22, 2007 from U.S. Appl. No. 10/884,811, 10 pages.
Office Action Response dated Jun. 13, 2007 from U.S. Appl. No. 10/884,811, 11 pages.
Office Action dated Mar. 14, 2007 from U.S. Appl. No. 10/884,811, 7 pages.
International Search Report and Written Opinion dated Dec. 12, 2006 from PCT Application No. PCT/IB2006/001822, 15 pages.
International Preliminary Report on Patentability dated Jan. 17, 2008 from PCT Application No. PCT/IB2006/001822, 18 pages.
International Search Report and Written Opinion dated Feb. 21, 2007 from PCT Application No. PCT/IB2006/002743, 11 pages.
International Preliminary Report on Patentability dated Apr. 8, 2008 from PCT Application No. PCT/IB2006/001822, 15 pages.
Office Action dated Aug. 17, 2009 from Korean Application No. 10-2008-7002303, 8 pages.
Office Action dated Jul. 13, 2010 from Mexican Application No. MX/a/2008/000158, 4 pages.

* cited by examiner

LOCAL NETWORK PROXY FOR A REMOTELY CONNECTED MOBILE DEVICE OPERATING IN REDUCED POWER MODE

FIELD OF THE INVENTION

This invention relates in general to communications devices, and more particularly to communications devices configured for providing remote access to an ad hoc local network.

BACKGROUND OF THE INVENTION

Mobile communications devices such as cell phones are becoming more popular due in part to the capabilities being added to such devices. Far from being simple voice communications tools, modern cell phones and related devices such as Personal Digital Assistants (PDAs) have become versatile digital communications and data processing tools. These devices form an important niche in the growing field of personal digital communications.

One factor that is expected to increase the popularity of mobile devices is the development of third generation (3G) technologies. The designation 3G refers to a collection of standards and technologies that can be used in the near future to enhance performance and increase data speed on cell phone networks. In particular, 3G is an International Telecommunication Union (ITU) specification for the third generation of mobile communications technology. A 3G network may utilize packet-switched data transmission services that mirror the Internet model, such as General Packet Radio System (GPRS) and Universal Mobile Telecommunication System (UMTS). A 3G cell phone would, in theory, be compatible with the 3G languages and standards that support access to public networks (e.g., the Internet) at enhanced data speeds.

Future 3G devices may include features that allow communication with other consumer electronics devices. In particular, the mobile devices may include secondary interfaces for communicating with non-telecom networks. For example, a home networking standard known as Universal Plug and Play™ (UPnP) provides a way for disparate processing devices to exchange data. The UPnP standard defines an architecture for peer-to-peer network connectivity utilizing a wide variety of electronic devices. The UPnP standard includes standards for service discovery, and is mainly targeted for proximity or ad hoc networks.

Various contributors publish UPnP device and service descriptions, thus creating a way to easily connect devices and simplifying the implementation of networks. UPnP is designed to work in many environments, including the home, businesses, public spaces, and on devices attached to the Internet. The UPnP standard is an open architecture that leverages Web technologies and is designed to provide ad-hoc networking and distributed computing.

The UPnP model is designed to support zero-configuration networking and automatic discovery for a wide variety of device categories. This allows a device to dynamically join a network, obtain an IP address, convey its capabilities, and learn about the presence and capabilities of other devices. Other Internet protocols such as Dynamic Host Configuration Protocol (DHCP) and Domain Name Service (DNS) may optionally be included in a UPnP network, although they are not required. A device can leave a UPnP network smoothly and automatically without leaving any unwanted state behind.

The UPnP architecture includes mechanisms for discovery of devices on the network and mechanisms for describing capabilities of those devices. The UPnP discovery protocol allows a device to advertise its services to control points on the network by utilizing multicast messages. Multicasting refers to a sending a single copy of data to multiple recipients on an Internet Protocol (IP) network. Devices can multicast one or more service announcement messages. Each message describes an embedded device and/or service available from the message's originator. Other devices on the network listen on the multicast address for these service announcement messages. This information can be used to by the devices to utilize UPnP services.

UPnP provides a convenient way for consumers to build a home network. Due to the particularities of the UPnP protocol, a UPnP home network is typically only accessible within the physical boundaries of the home. Limiting the physical boundaries of the UPnP network makes sense for many applications, and tends to simplify the network topology and increase performance. However, at some point, consumers may want to remotely access their home network while away. There are some solutions available but they are not purely UPnP. For example, they may utilize a non-UPnP gateway that will bridge the UPnP to the remote access technology. One drawback of this solution is that it requires changes in UPnP applications that operate on the remote devices in order to work properly.

Security is another concern when allowing external access to a home network. Home networks should be restrictive in accepting any outside connections for security reasons. Standard access protection mechanisms (e.g. password protected logins) are insufficient to guard against ever increasing intrusion threats on the Internet. To solve this problem, a group of technologies known as virtual private networks (VPN) were developed. A VPN is designed to provide secure access to a local network via untrusted, public networks. A VPN can also ensure that data transferred between remote devices and the local network cannot be read by third-parties.

A VPN gateway can provide safe access to a home network for remote users, although currently these devices are not utilized by typical home-network users. A VPN gateway may also provide remote access to UPnP elements of a network. However, running native UPnP protocols via a VPN connected through mobile networks such as GPRS/UMTS may cause technical problems. For example, some mobile devices may not want to constantly engage in the UPnP multicast traffic, yet may still want to remain accessible to other UPnP devices on the UPnP network. Therefore, to effectively allow remote devices to access a home UPnP network without customizing the UPnP applications, adaptations to the UPnP network may be required.

SUMMARY OF THE INVENTION

The present disclosure relates to connecting a mobile device to a local area network via a public network. In accordance with one embodiment of the invention, a method involves coupling the mobile device to the public network. A secure data connection is created via the public network between the mobile device and an access point of the local area network so that the mobile device operates in an address space of the local network. A proxy for the mobile device is operated on the local network. The proxy maintains one or more state variables related to operation of the mobile device on the local network. A reduced power mode of the mobile device is simulated on the local network via the proxy, for purposes of shaping traffic over the secure data connection. The state variables are provided to entities of the local network via the proxy on behalf of the mobile device.

In more particular embodiments, the method may further involve filtering, via the access point, multicast messages originating from the local network that are targeted for the mobile device. A wake up signal may be received on behalf of the mobile device in response to a network event targeted for the mobile device. Creating the secure data connection may involve establishing a virtual private network between the mobile device and the access point of the local area network. Providing the state variables to the entities of the local network may involve reserving an IP address of the local network on behalf of the mobile device, for example by issuing an address resolution protocol (ARP) response on behalf the mobile device to reserve the IP address on an auto-configured IP network. Further, an addressing mode of the local area network may be detected, and the IP address is reserved for the mobile device only if the addressing mode includes IP auto-configure. The mobile device may be via a packet switched radio network and/or the Internet.

In another embodiment of the invention, a computing arrangement includes a first network interface capable of being coupled to an ad-hoc, peer-to-peer local area network. A second network interface is capable of being coupled to a public network. The arrangement includes a processor coupled to the first and second network interfaces. A memory is coupled to the processor. The memory containing instructions that cause the processor to establish a secure data connection between a mobile device coupled to the public network and the local area network so that the mobile device operates in an address space of the local network. A reduced power mode of the mobile device is simulated on the local area network by the arrangement for purposes of shaping network traffic communicated via the secure data connection. The arrangement provides to entities of the local network one or more state variables related to operation of the mobile device on behalf of the mobile device.

In another embodiment of the invention, a processor-readable medium has instructions that are executable by a data processing arrangement capable of being coupled to an ad-hoc, peer-to-peer local area network and a public network. The instructions are executable by the data processing arrangement for performing steps involving establishing, via the public network, a secure data connection between a mobile device coupled to the public network and the local area network so that the mobile device operates in an address space of the local network. A reduced power mode of the mobile device is simulated by the arrangement on the local area network for purposes of shaping network traffic communicated via the secure data connection. Entities of the local network are provided one or more state variables related to operation of the mobile device by the arrangement on behalf of the mobile device.

In another embodiment of the present invention, a mobile terminal includes a network interface capable of being coupled to a public network. A processor is coupled to the network interface, and memory is coupled to the processor. The memory contains instructions that cause the processor to connect to an ad-hoc, local area network via a secure data connection operable over the public network. The terminal communicates with entities of the local area network via a proxy that simulates a reduced power mode of the mobile terminal on the local area network for purposes of shaping network traffic communicated via the secure data connection. The proxy is capable of maintaining one or more state variables related to operation of the mobile terminal on the local network. The terminal is capable of entering a reduced power mode, and utilizing the one or more state variables on the local network via the proxy after transitioning from the reduced power mode to a normal activity mode.

In another embodiment of the invention, a processor-readable medium has instructions that are executable by a mobile terminal capable of being coupled to a public network. The instructions are executable by the mobile terminal for connecting to an ad-hoc, local area network via a secure data connection operable over the public network. The terminal communicates with entities of the local area network via a proxy that simulates a reduced power mode of the mobile terminal on the local area network for purposes of shaping network traffic communicated via the secure data connection. The proxy is capable of maintaining one or more state variables related to operation of the mobile terminal on the local network. The terminal is capable of entering a reduced power mode, and utilizing the one or more state variables on the local network via the proxy after transitioning from the reduced power mode to a normal activity mode.

In another embodiment of the present invention, a system includes a local area network configured to provide ad-hoc data exchanges between consumer electronics devices coupled to the local area network. The system includes a publicly accessible network and a mobile device capable of being coupled to the publicly accessible network. The system further includes: means for creating, via the public network, a secure data connection between the mobile device and the local area network so that the mobile device operates in an address space of the local network; means for maintaining one or more state variables related to operation of the mobile device on the local network; means for simulating a reduced power mode of the mobile device on the local network for purposes of shaping traffic over the secure data connection; and means for providing the state variables to entities of the local network on behalf of the mobile device.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system, apparatus, and method in accordance with the invention.

BRIEF DESCRIPTION OF THE DRAWINGS

The invention is described in connection with the embodiments illustrated in the following diagrams.

DETAILED DESCRIPTION OF THE INVENTION

Figure 1:
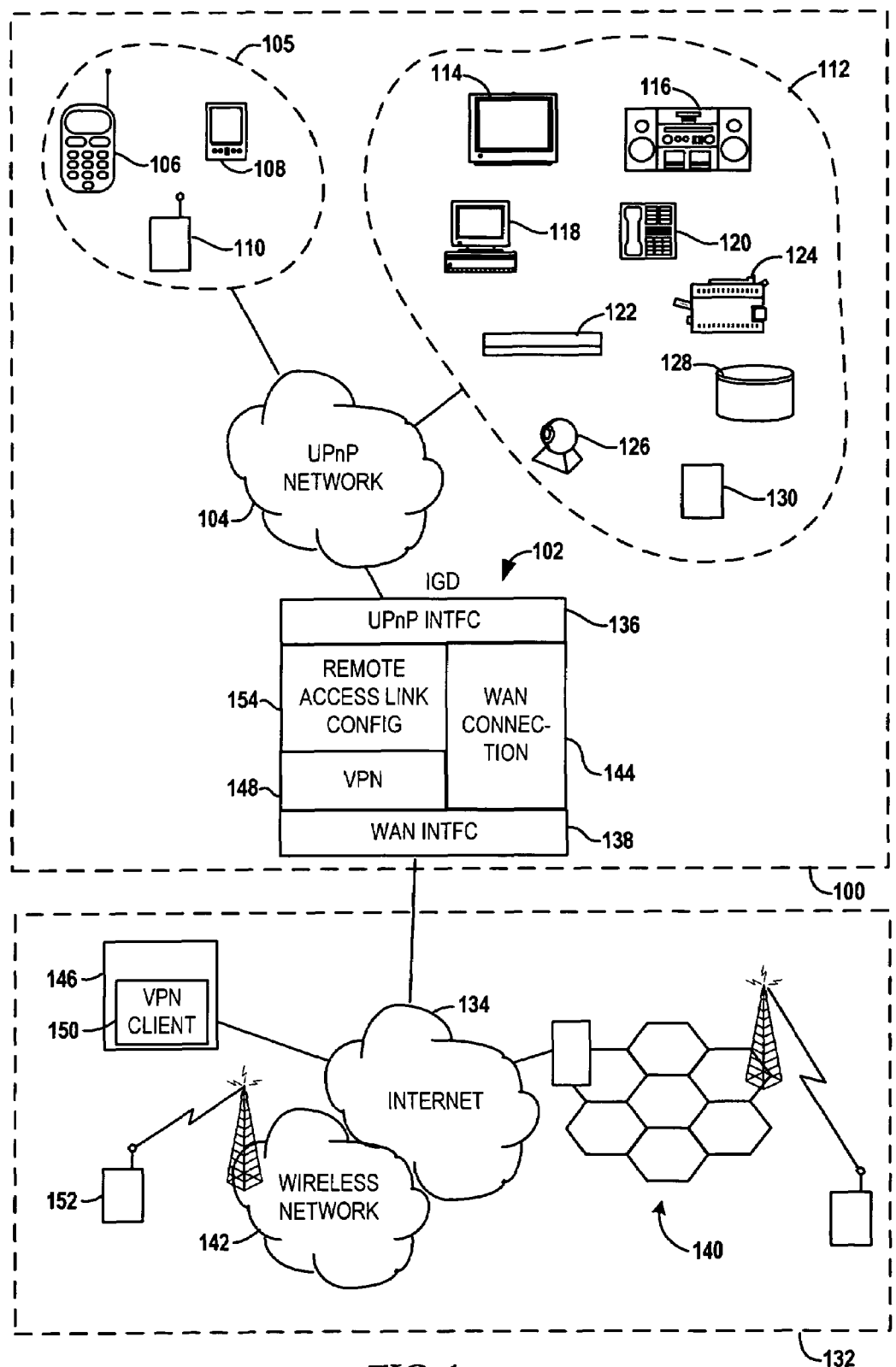
FIG. 1 illustrates a system for providing connectivity to an ad-hoc local area network for a mobile device according to embodiments of the present invention.

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present invention provides a way of remotely accessing an ad-hoc, consumer electronics-oriented local network by a mobile device coupled to a public network. A specialized gateway device is coupled to the local network and provides secure access to remote located entities. In particular, the gateway device may be used to form a virtual private network (VPN) that allows remote devices to appear as if they were directly connected to the local network. The gateway device includes design features that allow mobile wireless devices to efficiently utilize peer-to-peer features of the local network via the VPN connection. In particular, the gateway device uses existing peer-to-peer power management functions to reduce network traffic directed over the VPN yet still allow the device to appear as available to other entities of the peer-to-peer network.

The present invention is applicable in any type of communication systems and networks. The public networks may include the Internet, proprietary networks, cellular infrastructure, satellite communications, or any other publicly accessible data transmission medium or system known in the art. The local networks may include any proximity or ad-hoc networks that are adapted for consumer use. In order to facilitate an understanding of the invention, the local networking environment may described in the context of a Universal Plug and Play (UPnP) networking environment. It will be appreciated, however, that the invention may be applicable in any system or application where ad-hoc, peer-to-peer data communications between devices such as consumer and mobile electronics is desired.

The mobile device used to access the local network may be a cellular phone, Personal Digital Assistants (PDA), or any other type of portable device capable of wired or wireless data communications. Many of these mobile devices include the ability to communicate via a UPnP network. UPnP communications may occur over wired and wireless data interfaces that are available in the local environment. These interfaces may include 802.11 Wireless Local Area Networking (WLAN), Bluetooth™, Ethernet, USB, IEEE1394 (Firewire™), X10, or any other data transfer technology now known or later developed.

Some mobile devices use relatively slow and expensive wireless data links for communications. These data links may be provided over wireless voice and data networks such as Global System for Mobile Communications/GPRS (GSM/GPRS), 3G UMTS, Personal Communications Services (PCS), integrated Digital Enhanced Network (iDEN®), CDMA2000, etc. These links are not always well-suited for communicating with UPnP networks because UPnP is a "chatty" protocol and fails to take into account that the some data links may need to make more efficient use of network bandwidth.

In addition to using low bandwidth data links, mobile devices may also experience latency delays when communicating with remote networks. These delays may prevent the device from engaging in time-sensitive transactions that may be required of the UPnP protocol. Therefore, even if the mobile device has sufficient network bandwidth, it still may experience problems in remotely communicating with a UPnP network.

In a computing arrangement according the present invention, specialized UPnP network proxies allows mobile devices to use low-power mode states on the UPnP network to simulate a locally connected device that is in a low power mode. Such a proxy can allow the mobile device to remain connected with the UPnP network without having to deal with continuous multicast traffic and time-sensitive data transfers on the UPnP network. Using such a proxy has advantages in that it does not require changes to the UPnP specification in order to account the characteristics of mobile data links. The UPnP network proxies may be incorporated into a single physical device that allows portable devices to remotely access the home network. One such device that provides communications between a local network (e.g., UPnP network) and a remote network (e.g., the Internet) is known as an Internet Gateway Device (IGD).

In reference now to FIG. 1, an example local environment 100 is shown utilizing an IDG 102 according to embodiments of the present invention. The local environment includes a UPnP network 104 and may include many devices that are capable of being coupled to the network 104. These UPnP-capable devices may include mobile devices 105, such as cellular phones 106, PDA 108, and any other mobile device as represented by generic mobile device 110. Generally, mobile devices 105 can communicate via wireless data links, such as radio, infrared, etc. It will be appreciated that the mobile devices 105 may also use primary or secondary wired data links, such as provided by a cable connection or docking station.

The UPnP network 104 may also couple other consumer electronics devices 112, including televisions 114, audio systems 116, computers 118, telephones 120 (e.g., analog phones, digital phones, cordless phones, SIP phones), digital media centers 122 (e.g., set-top boxes, MP3 jukeboxes, personal video recorders, media hubs), printers 124, cameras 126, data storage 128, and other devices, represented by generic UPnP device 130. The UPnP network 104 allows devices 105, 112 to exchange data in the local environment 100 using ad hoc, peer-to-peer connections. The local environment 100 typically includes a home or office, although it will be appreciated that other environments may provide ad hoc, peer-to-peer connectivity, including automobiles, airplanes, boats, public wireless hotspots, etc.

The mobile devices 105 and consumer electronic devices 112 may be coupled to the UPnP network 104 in any manner known in the art. Generally, UPnP networks leverage existing Web technologies such as IP, TCP, UDP, HTTP, and XML to enable proximity networking. Proximity networking allows for transfer of control data and content among locally situated networked devices. UPnP establishes a standard way for devices to communicate at a network and application level, therefore allowing the devices 105, 112 to be assembled into working systems with a minimum of programming or device modification.

The UPnP network 104 may be configured to provide communications between the local environment 100 and an external environment 132. For example, the IGD 102 may allow devices in the local environment 100 to access networks of the external environment 132, such as the Internet 134. The IGD 102 is an IP addressable device typically residing at the edge of a home or small-business network. The IGD 102 includes a UPnP interface 136 capable of accessing the UPnP network 104 and a Wide Area Network (WAN) interface 138 capable of accessing the Internet 134 or other external networks.

The IGD 102 may also provide local addressing and routing services between one or more LAN segments in the local environment 100. For example, the IGD 102 may bridge a Bluetooth network segment with an Ethernet segment. The IGD 102 may be a standalone component or combined with other network products, such as a router, wireless access point (AP), etc. In some cases, a mobile device 105 (e.g., mobile phone 106) may also act as IGD 102. Such devices 105 may have access to external wireless networks such as third generation cellular networks (3G), General Packet Radio Service (GPRS), Ultra Wideband (UWB), etc. Whatever physical form the IGD 102 takes, it is considered a "logical device" as that term in used in the UPnP parlance.

In the UPnP framework, network entities are abstracted into logical entities known as logical devices. A logical device is a container for both other logical devices and for services. For example, a UPnP television monitor could be considered to be a logical device that contains both a video renderer logical device and a sound renderer logical device. Each of these logical devices may have one or more associated services. The video renderer device, for example, may provide rendering services for both still and moving images.

The primary purpose of the IGD device 102 is to provide connectivity services between the local environment 100 and the external environment 132. The external environment 132 may include the Internet 134, cellular communication networks 140, and other wireless networks 142. The IDG 102 includes a WAN connection service 144 that enables devices on the UPnP network 104 to access the external environment. The WAN connection service 144 enables a UPnP control point to configure and control connections on the WAN interface 138 of a UPnP compliant IGD 102. Although the WAN connection service 144 may implemented for any manner of data connections, the most common type of connections use the Internet Protocol (IP). Therefore the IGD 102 may implement a WAN IP connection service 144 if an IP connection is used for WAN access. Elements of the UPnP network 104 can use this IP connection service 144 to access the Internet 134, which uses the IP protocol for packet-switched data transfer.

In many situations, the user may also wish to access the UPnP network 104 remotely via the Internet 134. For example, the user may utilize an Internet coupled device 146 to remotely control UPnP devices 105, 112 in the local environment 100. For security purposes, data transfers between the remote device 146 and the UPnP network 104 should be designed to prevent unauthorized access and to prevent the content of data exchanges from being read by third parties. One way that the IGD 102 can provide this security is by way of a Virtual Private Network (VPN) access module 148.

A VPN generally refers to a method for securely exchanging data between two trusted entities via an untrusted network. In this example, the trusted entities are the remote device 146 and the UPnP network 104, and the untrusted network is the Internet 134. The VPN is formed by creating a secure "tunnel" for data transferred between trusted entities. The remote device 146 includes a VPN client module 150 that communicates with the VPN access module 148 of the IGD 102. The VPN uses encryption to provide data privacy and integrity, and utilizes endpoint authentication to prevent unauthorized intrusions.

Various methods of VPN access are known in the art. Some known VPN access protocols include Point-to-Point Protocol (PPP) over Secure Shell (SSH), PPP over Secure Sockets Layer (SSL)/Transport Layer Security (TLS), IPsec, FreeS/WAN, and Point-to-Point Tunneling Protocol (PPTP), Virtual Tunnel (VTun), Crypto IP Encapsulation (cIPe), and tinc. The VPN access module 148 may be implemented in specialized hardware (e.g., a firewall, router, IGD 102, etc.) or may be run on a general-purpose computer. The VPN client module 150 will generally utilize one or more VPN access protocols that are compatible with the VPN access module 148.

One advantage of a VPN is that it allows the remote device 146 to appear to be directly connected to the local network 104. The remote device 146 is issued an IP address that is in the local network address space. Once connected, all networking applications operate as if the device 146 was on the local network. The remote device 146 then has access to all network services, and higher-level protocols (e.g., directory services, network drives, etc.), and will seamlessly connect to UPnP devices and services. Using a single address space is advantageous for accessing services of the UPnP network 104, which generally assumes other services and devices are using the same network address space.

It is possible that a user will remotely access the UPnP network 104 while on the move, thus the user could use a wireless device 152 coupled to the UPnP network 104 via the VPN access module 148. The wireless device 152 may have access to only limited network bandwidth, and thus would like to limit the network traffic received from the UPnP network 104. Besides saving bandwidth, limiting UPnP traffic over the wireless link will also help the wireless device 152 to save power, and may reduce problems due to latency on the wireless link.

In order for a remotely coupled device 152 to limit network bandwidth but still maintain state on a UPnP network 104, the IGD 102 may include a remote access link configuration service 154. This configuration service 154 provides a number of features that assist a typically low-bandwidth device (e.g., the wireless device 152) in accessing the UPnP network 104. The configuration service 154 may include the ability to maintain UPnP network state variables, reduce multicast traffic, and manage device wake-up. In this way, the remote access link configuration service 154 can intelligently shape traffic over the WAN interface 138 to account for the needs of a remotely connected wireless device 152. In particular, the configuration service 154 can make it appear that the wireless device 152 is in a low power mode, even if the device 152 is not currently operating in such a mode. In this way, traffic from the UPnP network 104 will be reduced, because a device in low power mode is not expected to respond to continuous UPnP traffic that checks the state of devices on the UPnP network.

Figure 2:
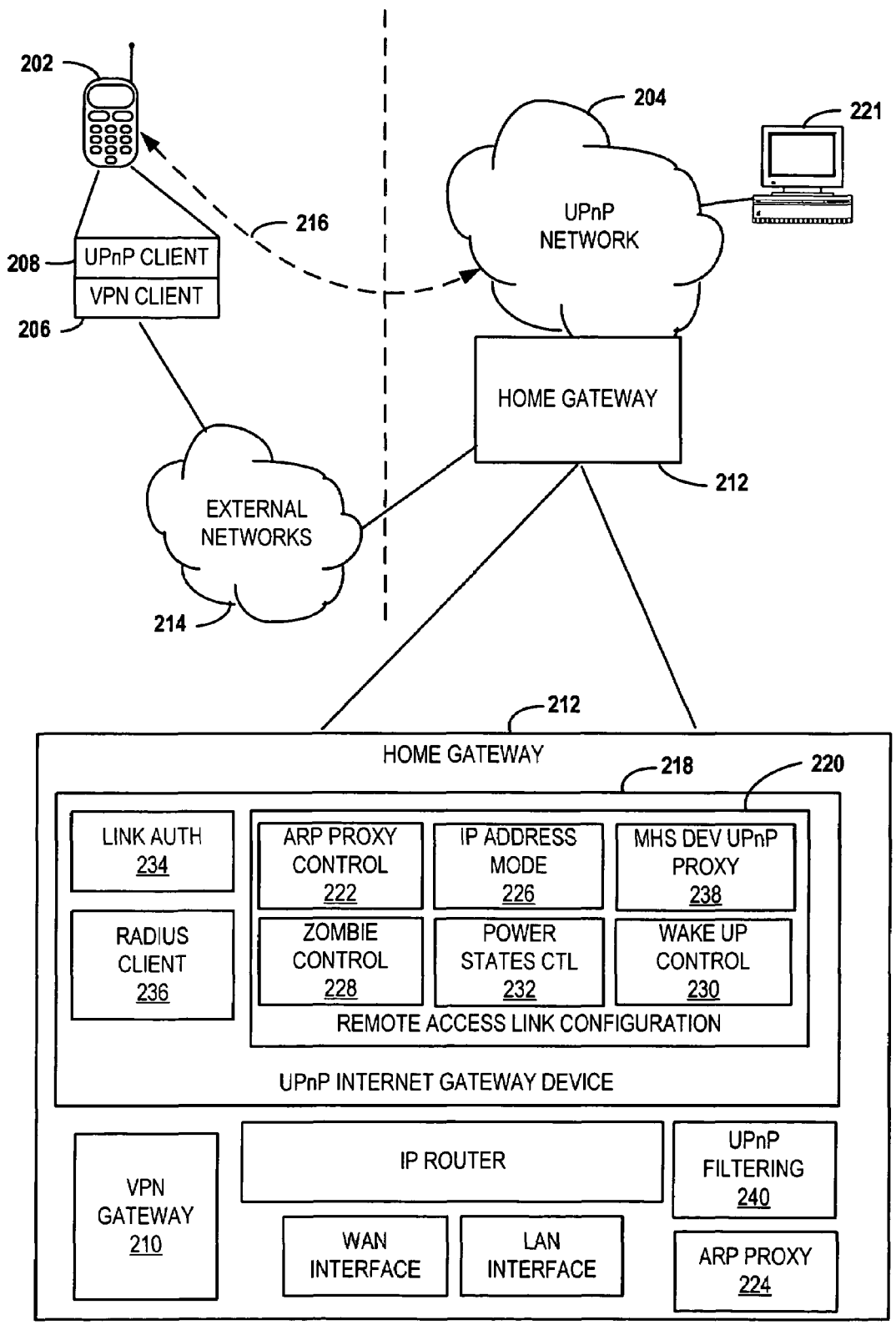
FIG. 2 illustrates a network access point for providing connectivity to a remote mobile device according to embodiments of the present invention.

In reference now to FIG. 2, an example connection of a mobile client device 202 to a UPnP network 204 is shown according to embodiments of the present invention. The client device 202 includes a VPN client module 206 and a UPnP client module 208. The UPnP client module 208 contains the ability to access and/or provide UPnP service while directly coupled to the UPnP network 204. The VPN client module 206 allows the UPnP module 208 to operate within the address space of the UPnP network 204 when remotely connected. The UPnP module 208 can therefore operate remotely without any modification to the UPnP protocol stack or UPnP applications.

The VPN client 208 connects with a VPN gateway module 210 of a home gateway 212 via one or more external networks 214 (e.g., the Internet). The VPN modules 208, 210 provide a virtual connection between the client device 202 and the UPnP network 204, as represented by path 216. The virtual connection 216 allows the client device 202 to communicate using the address space of the UPnP network 204. The virtual connection 216 is generally encrypted, and the identity of devices at the endpoints of the connection 216 is verified using authentication (e.g., by using cryptographically signed certificates).

To maintain the virtual connection 216, the home gateway 212 may include a UPnP Internet Gateway Device (IGD) 218. The IGD 218 includes a remote access link configuration service 220 that performs services on behalf of the client device 202. Generally, the remote access link configuration service 220 may act as a proxy for the device 202 on the local network 204, so that certain network interactions that are handled locally by the service 220. Using a proxy in this manner is especially useful for interactions that unnecessarily consume bandwidth and/or are time critical.

The remote access link configuration service 220 may also interact with the VPN gateway module 210. The VPN gateway module 210 may include its own UPnP configuration service, and/or the VPN gateway module 210 may be configured via the remote access link configuration service 220. The remote access link configuration service 220 may assist in transferring data between entities of the UPnP network 204 and VPN connections established via VPN gateway module 210. The remote access link configuration service 220 and VPN gateway module 210 may be included in the same functional unit of the home gateway 212, or may be separate functional entities. For example, the home gateway 212 may include a VPN configuration service (not shown) that inherits from the remote access link configuration service 220

The remote access link configuration service 220 can be configured to perform time-critical tasks that are required to maintain state variables on the UPnP network. These state variables may be established at any layer of network operations, including the data link, network, transport, session, and application layers. For example, in order to transfer Ethernet datagrams between network devices, the UPnP network 202 typically utilizes the Address Resolution Protocol (ARP). ARP is used to establish associations between data link layer identifiers (e.g., hardware addresses) and network layer identifiers (e.g., IP addresses). An ARP proxy control module 222 may be used to maintain the state of IP addresses allocated to the remote device 202 via ARP.

ARP enables finding an Ethernet hardware address, or Media Access Control (MAC) address, of a device in a network based on the device's IP address. When a device sends an IP packet to another device on the UPnP network 204, the sending device's IP software will first check to see if it has cached the MAC address associated with the destination IP address. If so, then the sender just transmits the data to the destination system, using the appropriate protocols and addressing. However, if the destination system's MAC address is not known, then the IP software has to locate the address before any data can be sent. At this point, IP will call on ARP to locate the hardware address of the destination system.

In IP networks, ARP may also be used as part of a scheme for allocating IP addresses. For example, in systems using Dynamic Host Configuration Protocol (DHCP), devices may probe the network for other devices that are currently using an IP address that the device desires to use. With DHCP ARP, the requesting device issues a normal ARP request, except that the request is formed with the IP address of "0.0.0.0" in the Source Protocol Address field and the desired IP address in the Destination Protocol Address field. If there is no response to the ARP request, the desired IP address may be safely used by the requestor.

Where the network 204 includes a specialized device for providing DHCP services (e.g., the home gateway 212 or other device 221), the DHCP server ensures that the IP address allocated to a particular device is "defended" by responding to DHCP ARP requests. Where there is no DHCP server (e.g., the devices autoconfigure themselves), each device must defend its own IP address. However, if the device such as the client device 202 is remotely connected and/or in a power saving state, it may be unable to perform this function. In order to allow the device 202 to maintain a currently used IP address, the home gateway 212 may utilize the ARP proxy control module 222 and ARP proxy 224 to defend the IP address for the client device 202.

The ARP proxy control 222 can be configured to defend IP addresses using the ARP protocol for any number of devices that have power saving modes or are remotely connected. The ARP proxy control 222 generally works in conjunction with the ARP proxy 224 to provide ARP services on behalf of the client device 202. For example, due to the VPN connection, 216, the client device 202 might have an IP address that appears to be on the local network 204, although the device 202 is not physically coupled to the network 204. Nodes that try to communicate with this device 202 would believe that the device 202 was local, and would use ARP to try and find the associated hardware address. Because the client device 202 is remote, it would not see the ARP lookups nor be able to respond to those lookups. Therefore the ARP proxy 224 may be enabled to respond to ARP broadcasts on behalf of the client device 202. In example, the ARP proxy would provide the MAC address of the home gateway 212 in response to ARP requests of the client device 202, because the home gateway 212 is also responsible for routing data to the client 202.

At any given time, it may be necessary for components of the remote access link configuration service 220 to know what the current IP addressing mode is. For example, the ARP proxy control 222 must know whether the network is using DHCP or autoconfig to allocate IP addresses. To detect and communicate the current IP addressing mode, the remote access link configuration service 220 includes an IP addressing mode component 226. The IP addressing mode 226 works like a sensor that detects what addressing mode is used in the UPnP network 204. The IP addressing mode 226 may communicate the current state of IP addressing by using an element in the link configuration service 220. This element may be represented as <xs:element name="addressingMode" type="xs:string"/>. There are at least two valid values for the addressingMode state variable: "DHCP" when the IP addressed are allocated by a DHCP server, and "Auto-IP" when the IP addresses are autoconfigured.

As described above, the remotely connected client device 202 may rely on the ARP proxy control 222 and ARP proxy 224 to defend IP addresses for the device 202, whether or not the device 202 is in a power saving mode. The remote access link configuration service 220 may provide similar functions to reduce traffic by indicating that the device 202 is in a power saving mode, even when the device 202 is not. These functions can be handled by components such as the zombie control 228, the wake up control 230, the power state control 232, the link authentication 234, the radius client 236, and the low power proxy 238.

The zombie control 228 maintains a list of state variables, such as states that are reflected in a UPnP data structure known as "associatedDevice." Generally, the link configuration service 220 maintains an associatedDevice data structure for each attached device such as the client device 202. This data structure is typically destroyed when the association between the access point (e.g., the home gateway 212) and the attached device 202 is lost. The problem with destroying these data structures is that it doesn't account for mobile devices 202 that are power constrained. These devices 202 may enter into a sleep mode (or other power saving mode) and in doing so, unintentionally lose the association with the access point. When the association is lost, the network connection is lost, and the device 202 disappears from the UPnP network 204.

In order to allow a client device 202 to remain visible on the network in a power saving mode, the link configuration service 220 utilizes the zombie control 228 to maintain the associatedDevice data structure of the client device 202. The zombie control 228 maintains the associatedDevice structure even if the association is lost due to a power saving mode (either real or simulated) of the client device 202. The zombie control can achieve this by adding a new state variable, "zombie," to the associatedDevice data structure. The "zombie" variable indicates if that particular device is a zombie or not, and may be represented as <xs:element name="zombie" type="xs:boolean"/>.

The wake up control function 230 is responsible with waking up the devices that are in hibernate mode. A device can wake-up another device by sending an UPnP action (i.e. wakeUp) to the network infrastructure device (NID) where the hibernating device is or was attached. The power state control function 232 is responsible with keeping track of the power states of each attached device. The power state control function 232 can be used by the wake up control function 230, for example, to look up the current power state of devices that may need to be woken up.

The link authentication 234 and radius client 236 are UPnP services that are responsible for implementing the 802.1X authentication framework. These two 234, 236 services may be made optional. The link authentication 234 is used when the authentication function is co-located with the home gateway 212. The radius client 236 is used when the authentication server is a stand-alone element in the network 204. The functionality of the link authentication 234 and radius client 236 are described in greater detail in the UPnP WLAN Access Point Device Template (version 1.01), which is published and made available by the UPnP Forum.

The low power proxy 238 is a component that may be used with or instead of the remote access link configuration module 220. The low power proxy may be able more effectively support certain power modes (e.g. deep sleep/offline). The low power proxy 238 can also be used for handling of device specific wake up mechanisms. The low power proxy 238 allows power managed UPnP devices (e.g., 202) to transition to any of the power states defined herein, and yet still remain part of the UPnP network 204. The low power proxy 238 may also simulate a low power mode on behalf of the device 202 in order to reduce network traffic or reduce sensitivity to time-critical tasks. The UPnP network 204 may have distributed low power proxies 238 to increase the reliability of a power-managed device's presence. The low power proxy 238 may include additional functionality that allows the UPnP device to outsource some functions. The proxy acts on behalf of the sleeping device, hence increasing the UPnP device power saving opportunities.

The low power proxy 238 may be enable to handle multicast/unicast discovery messages on behalf of remotely connected UPnP devices in order to be aware of their power states (e.g., the proxy acts as UPnP control point). The low power proxy 238 can implement advanced functionality that allows the device to outsource to the power manager proxy some of the basic functionality such as responding to M-SEARCH queries or sending the announcements while the device is in Transparent or Deep Sleep/Online mode. The low power proxy 238 may be enabled to send announcements and react to M-SEARCH messages as if the proxy 238 were the power-managed device. This allows a device to be discovered by a UPnP control point even if the device is in a real or simulated sleep mode, because the proxy acts on behalf of the sleeping UPnP device.

Many of the components of the home gateway 212 will require adding or modifying state variables associated with the "associatedDevice" structure. As described above, the zombie control 228 will maintain a "zombie" value. Other values that may be maintained include "devicePowerState" that is maintained by the power states control 232 and a "lowPowerProxy" variable maintained by the low power proxy 238. An example XML fragment showing some of these variables is presented in LISTING 1 below.

---

LISTING 1

```
<xs:element name="associatedDevice" minOccurs="0" maxOccurs="7">
<xs:complexType>
<xs:sequence>
<xs:element name="deviceBDAddress" />
<xs:element name="deviceIPAddress" />
<xs:element name="deviceAuthenticationState" />
<xs:element name="devicePowerState" />
<xs:element name="lowPowerProxy" />
<xs:element name="zombie" type="xs:boolean" />
</xs:sequence>
</xs:complexType>
</xs:element>
```

---

Other components within the home gateway 212 may help reduce traffic sent to a UPnP coupled mobile device, regardless of whether the device is locally or remotely coupled. For example, the UPnP filtering function 240 may be configured to filter the UPnP multicast messages that are coming from the UPnP network domain 204. Many UPnP multicast messages are repetitive and redundant, such as UPnP service announcements. In some situations, these messages can consume significant network bandwidth, especially if many devices and/or services are coupled to the network. The UPnP filter 240 can monitor this traffic and only allow relevant messages to pass to a low bandwidth device such as the client device 202. The UPnP filter 240 may also cache multicast message so that certain multicast request/response messages may still be communicated to the client device 202 on an as-needed basis.

Figure 3:
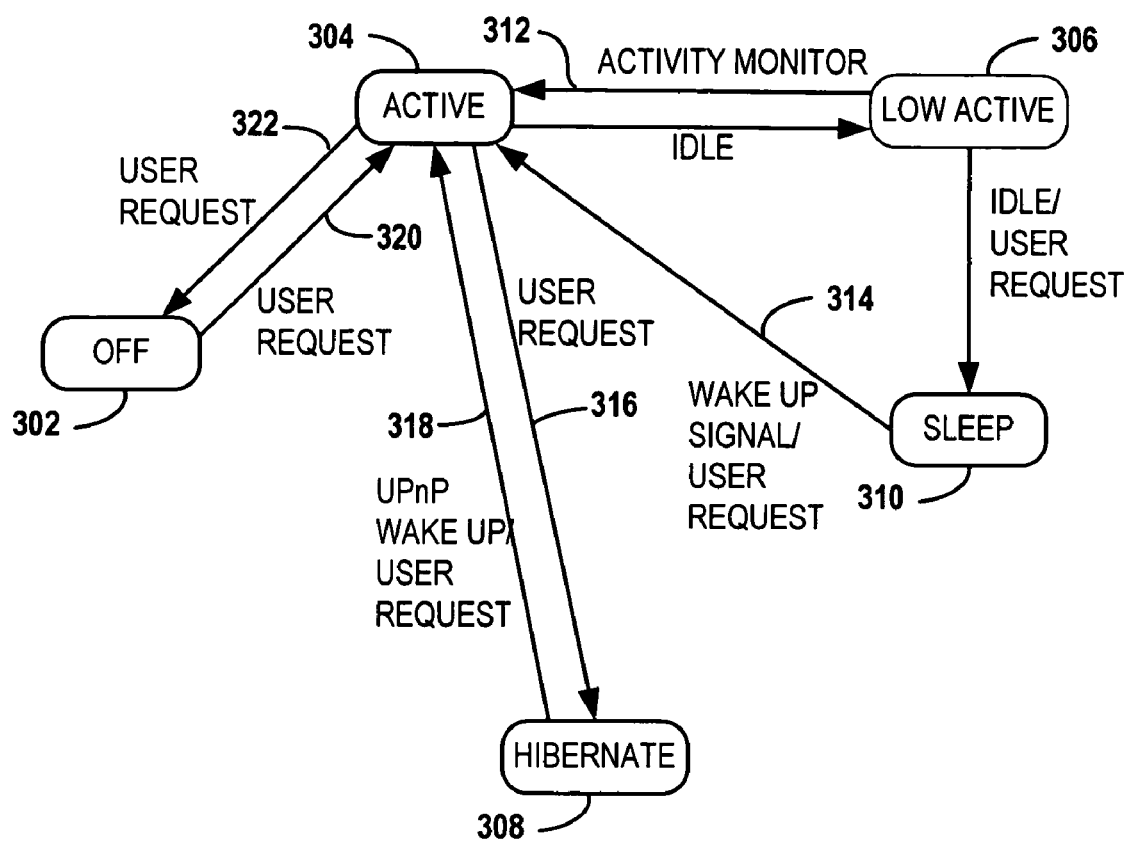
FIG. 3 illustrates a state diagram for power saving modes of a mobile device according to embodiments of the present invention.

In order for UPnP network entities to adapt to power states of the client device 202, a common vocabulary must be used when describing different power states. In reference now to FIG. 3, a power state diagram is shown that may be used by network-coupled devices according to embodiments of the present invention. A mobile handheld device or its proxies may utilize any of the several alternative power states as shown in FIG. 3, including off 302, active 304, low activity 306, hibernate 308, and sleep 310. The device may move to different power states according user preferences, measures of current activity, and estimates of future activity.

The device may include descriptions of its power save schemes in service discovery description. These service descriptions may be multicast to other UPnP network entities so that other devices can discover and utilize the service. The home gateway (e.g., home gateway 212 in FIG. 2) generally acts as a bridge between mobile handheld devices and the home domain. As part of this bridging, the home gateway may be enabled to manage the different power states on behalf of various proxy services of the UPnP network.

In the active state 304, the mobile device is operating at full power and may be currently sending and receiving data. The device itself is not saving power in the active state 306, and services offered by the device will generally remain active. In active state 306, UPnP multicast messages may still be filtered by a UPnP filtering component (e.g. component 240 in FIG. 2) unless the user specifies otherwise.

In the low activity state 306, the mobile device is responding almost as quickly as in the active state 304, and may provide the same services as in active state 304. The device may employ telecom power saving features while in the low activity state 306 to conserve power on relatively high-power circuitry such as cellular transceivers. On lower-power interfaces such as Bluetooth, the device may enter a power saving "sniff" mode. In Bluetooth sniff mode, the devices listens in predetermined time slots to detect whether there is incoming traffic. If the device is sending traffic, the link is immediately awakened, as indicated by transition 312.

The home gateway (e.g., home gateway 212 in FIG. 2) takes a more prominent role in the low activity state 306. The home gateway provides an ARP proxy for serving address resolution and duplicate address detection on behalf of the mobile device in the low activity state 306. This enables prolonged sleep times for the mobile device. The home gateway may also filter UPnP multicast messages in the low activity state 306. These optimizations allow the affected device to sleep most of the time in the low activity state 306, yet keep the device's response times very short.

The sleep state 310 provides greater energy savings than the low activity state 306. In the sleep state 310, it is assumed that the mobile device can be awakened in reasonable amount of time. In this state 310, the mobile device is mostly inactive, but periodically checks whether it is required to wake up. Wake up can be initiated either by the user or by a proxy that gives the wake up signal, as indicated by transition 314. In the sleep state 310, the device maintains its IP address and application states, but is not receiving traffic other than the wake up signal 314. A UPnP proxy maintains UPnP presence for the sleeping device and an ARP proxy keeps the device's IP address alive. Sleep mode is by definition slower to wake up, therefore greater TCP protocol delay and more retransmissions should be tolerated. For instance, a typical TCP implementation for use with this state 310 should include an initial retransmission time out value set to approximately one second. This would allow almost three seconds for the mobile device to answer.

The hibernate state 308 is used to keep device in a low energy mode, where it can be wakened. The device does not keep IP or application states while in hibernate 308, although an IP zombie module (e.g., module 228 in FIG. 2) may allow the device to acquire its normal IP address when leaving the hibernate state 308. The device may leave hibernate state 308 by user request, as indicated by transition 318. The transition 318 may also be in response to a UPnP wake up signal. The device generally does not enter hibernate state 308 except from the active state 304 in response to a user request, as indicated by transition 316.

The off state 302 represents a complete power down, and the device is removed from any UPnP networks. In the off state 302, the device has been powered off and cannot be activated without user's physical interaction, as indicated by transition 320. Similarly, the device cannot be placed in the off state 302 without a user request being initiated from the active state 304, as indicated by transition 322.

It may be possible to have the device transition directly between two low power states, such as between sleep 310 and hibernate 308, or between hibernate 308 and off 302. However, such transitions may be unpredictable and therefore are not illustrated in the state diagram of FIG. 3. As shown below, TABLE 1 illustrates the status of various network interfaces (e.g., bearers) while in the various states illustrated in FIG. 3. In TABLE 2, also shown below, the asterisks indicate which components within the connectivity function (e.g., function 218 in FIG. 2) are enabled when an attached device is in a particular power state.

TABLE 1

| State Bearer | Active | Low-active | Sleep | Hibernate | OFF |
|---|---|---|---|---|---|
| Blue-tooth | Radio: ActivePAN: Active | Radio: Sniff, 2s PAN: Active | Radio: Sniff, 4s PAN: Active | Radio: Sniff/ParkPAN: Off | Off |
| 802.11 | Active | Power save mode, every beacon Poll | Power save mode, every x beacon poll | Power save mode, Max beacon poll, network state: Inactive | Off |
| Ethernet | Ethernet device is active | N/A | N/A | Ethernet WoL for interface active, otherwise device is inactive | Off |

TABLE 2

| | ARP Proxy | UPnP Filtering | Wake-up | Zombie | UPnP Proxy |
|---|---|---|---|---|---|
| Active | * | * | | | (*) |
| Low-activity | * | * | | | (*) |
| Sleep | * | * | | | * |
| Hibernate | * | | * | * | * |
| Off | | | | | |

Figure 4:
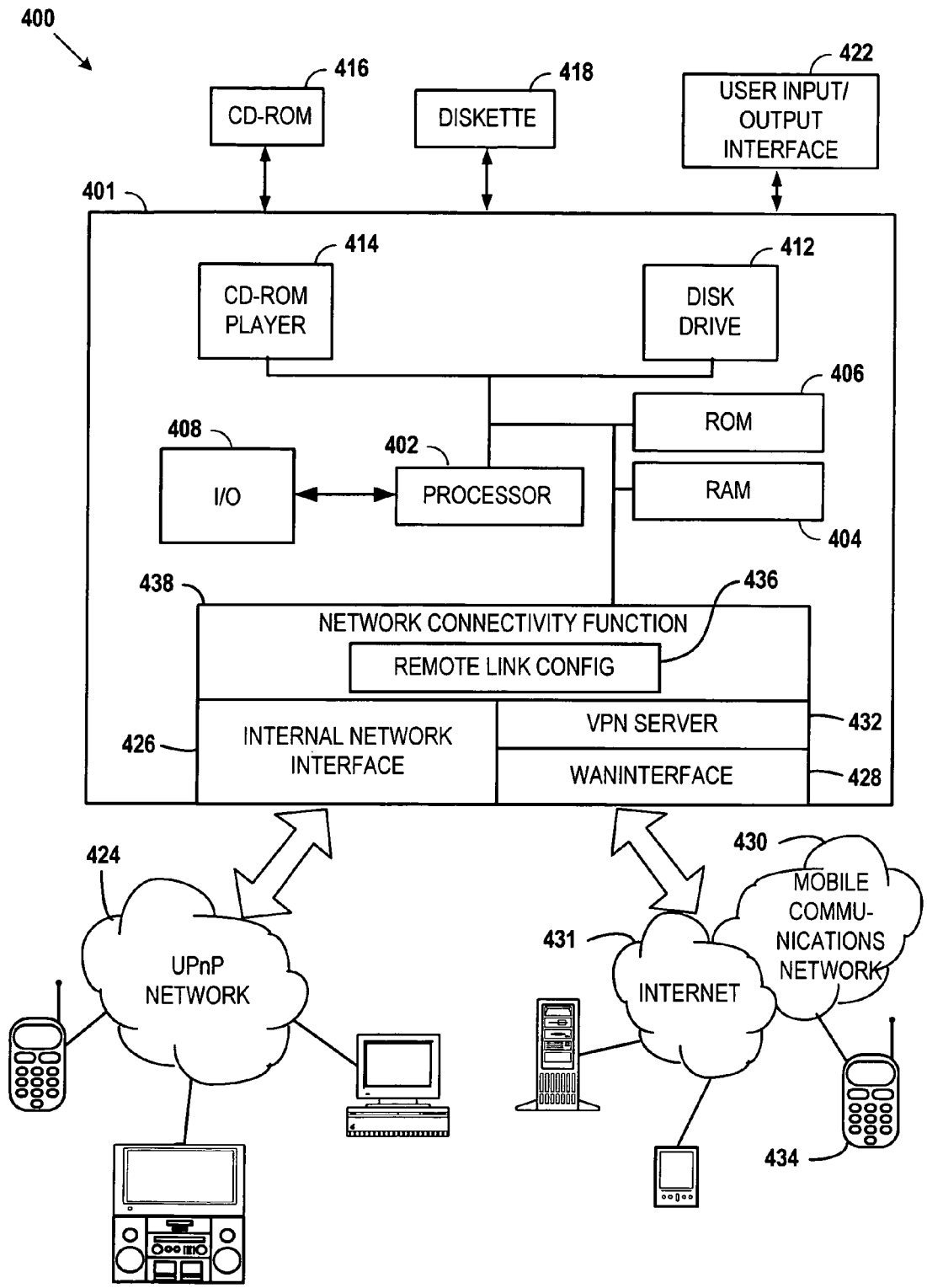
FIG. 4 illustrates an apparatus configured for providing local network connectivity to a remote mobile device according to embodiments of the present invention.

In reference again to FIG. 2, it will be appreciated that the functions of the VPN gateway 210 and home gateway 212 may be implemented using any combination of hardware and software known in the art. These components 210, 218 may be implemented as a standalone device, a processor-implemented service, or be included as part of other electronic equipment, including computers, routers, wireless access points, set-top boxes, etc. The components 210, 218 may be implemented on a single machine, or may be distributed among a number of computing entities. In reference now to FIG. 4, an example computing structure 400 is shown that is suitable for providing any combination of VPN gateway 210 and home gateway 212 according to embodiments of the present invention.

The computing structure 400 includes a computing arrangement 401. The computing arrangement 401 may include custom or general-purpose electronic components.

The computing arrangement 401 includes a central processor (CPU) 402 that may be coupled to random access memory (RAM) 404 and/or read-only memory (ROM) 406. The ROM 406 may include various types of storage media, such as programmable ROM (PROM), erasable PROM (EPROM), etc. The processor 402 may communicate with other internal and external components through input/output (I/O) circuitry 408. The processor 402 carries out a variety of functions as is known in the art, as dictated by software and/or firmware instructions.

The computing arrangement 401 may include one or more data storage devices, including hard and floppy disk drives 412, CD-ROM drives 414, and other hardware capable of reading and/or storing information such as tape, DVD, flash-memory drive, etc. In one embodiment, software for carrying out the operations in accordance with the present invention may be stored and distributed on a CD-ROM 416, diskette 418 or other form of media capable of portably storing information. These storage media may be inserted into, and read by, devices such as the CD-ROM drive 414, the disk drive 412, etc. The software may also be transmitted to computing arrangement 401 via data signals, such as being downloaded electronically via a network, such as the Internet 431.

The computing arrangement 401 may be coupled to a user input/output interface 422 for user interaction. The user input/output interface 422 may include apparatus such as a mouse, keyboard, microphone, touch pad, touch screen, voice-recognition system, monitor, LED display, LCD display, etc. The user interface 422 may include physical devices, or may be a pure virtual interface such as provided by Virtual Network Computing (VNC) software and similar technologies.

The computing arrangement 401 may be coupled to other computing devices via networks. In particular, the arrangement 401 may be locally coupled to a UPnP network 424 via an internal network interface 426. A WAN interface 428 may also be included with the computing arrangement 401. The WAN interface 428 is generally used to communicate with elements outside the UPnP network 424, such as a mobile services network 430 and/or the Internet 431. The network interfaces 426, 428 may include hardware and software components, including circuitry, firmware, drivers, programs, and protocol modules. It will be appreciated that the network interfaces 426, 428 may share the same hardware and/or software in providing their respective functions. Alternatively, the network interfaces 426, 428 may contained in physically separate devices.

A VPN gateway component 432 is coupled to the WAN interface 426 for purposes of providing a secure communications via the external networks 430, 431 for an externally connected device 434. The VPN server component 432 may, for example, utilize any manner of encryption and authentication protocols to ensure endpoint identity, data integrity, and data privacy. The remote data links provided by the VPN gateway component 432 may be managed by a UPnP remote link configuration function 436, which itself is a function of a UPnP network connectivity function 438. The UPnP network connectivity function 438 may encompass some or all of the functionality of a UPnP IGD (e.g., IGD 218 in FIG. 2)

The network connectivity function 438 provides proxy services and state management for remote mobile devices 434 connecting via the VPN server component 432. The network connectivity function 438 takes into account bandwidth and power considerations as described hereinabove to allow a remotely connected mobile device 434 to seamlessly interoperate with devices coupled to the local UPnP network 424. Any UPnP-enabled device that is capable of exploiting VPN data connections via public networks 430, 431 may utilize the data computing structure 400. The UPnP enabled device 434 may provide and utilize UPnP in the same manner as if the device 434 was locally situated, except that data connections are provided via a VPN tunnel. The device 434 may be enabled to either manually or automatically utilize the VPN in this way.

Figure 5:
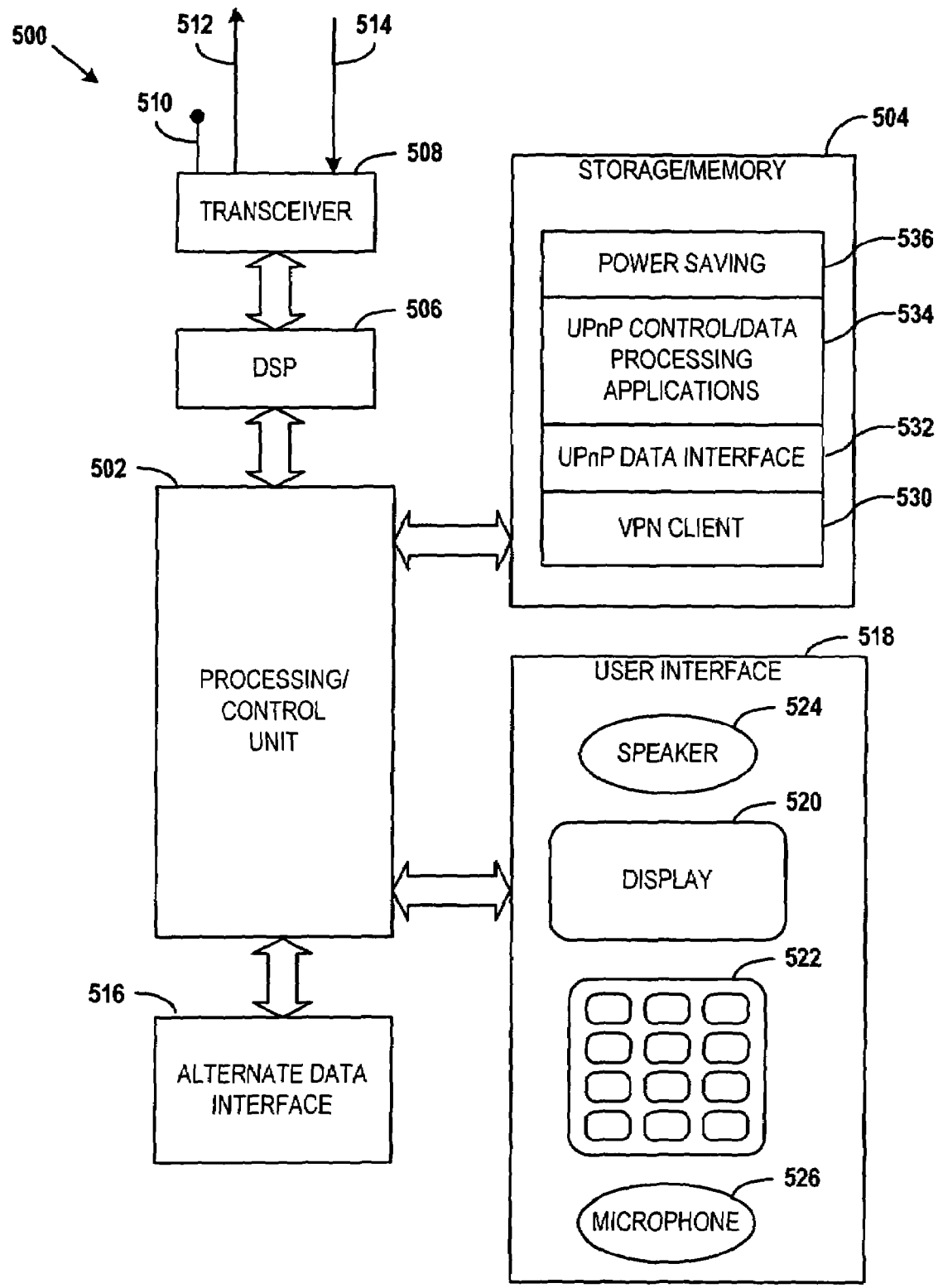
FIG. 5 illustrates a mobile terminal configured for remotely connecting to an ad-hoc local area network according to embodiments of the present invention.

An example of a UPnP-capable mobile computing arrangement 500 that is able to communicate via a VPN according to embodiments of the present invention is shown in FIG. 5. Those skilled in the art will appreciate that the exemplary mobile computing arrangement 500 is merely representative of general functions that may be associated with such mobile devices, and also that landline computing systems similarly include computing circuitry to perform such operations.

The illustrated mobile computing arrangement 500 may be suitable for performing any manner of UPnP functions, such as being a UPnP service provider and/or UPnP control point. The mobile computing arrangement 500 includes a processing/control unit 502, such as a microprocessor, reduced instruction set computer (RISC), or other central processing module. The processing unit 502 need not be a single device, and may include one or more processors. For example, the processing unit may include a master processor and associated slave processors coupled to communicate with the master processor.

The processing unit 502 controls the basic functions of the arrangement 500. Those functions may be included as instructions stored in a program storage/memory 504. In one embodiment of the invention, the program modules associated with the storage/memory 504 are stored in non-volatile electrically-erasable, programmable read-only memory (EEPROM), flash read-only memory (ROM), etc. so that the information is not lost upon power down of the mobile terminal. The relevant software for carrying out conventional mobile terminal operations and operations in accordance with the present invention may also be transmitted to the mobile computing arrangement 500 via data signals, such as being downloaded electronically via one or more networks, such as the Internet and an intermediate wireless network(s).

The program storage/memory 504 may also include operating systems for carrying out functions and applications associated with functions on the mobile computing arrangement 500. The program storage 504 may include one or more of read-only memory (ROM), flash ROM, programmable and/or erasable ROM, random access memory (RAM), subscriber interface module (SIM), wireless interface module (WIM), smart card, hard drive, or other removable memory device.

The mobile computing arrangement 500 also includes hardware and software components coupled to the processing/control unit 502 for performing network data exchanges. The mobile computing arrangement 500 may include multiple network interfaces for maintaining any combination of wired or wireless data connections. In particular, the illustrated mobile computing arrangement 500 includes wireless data transmission circuitry for performing mobile service network data exchanges.

This wireless circuitry includes a digital signal processor (DSP) 506 employed to perform a variety of functions, including analog-to-digital (A/D) conversion, digital-to-analog (D/A) conversion, speech coding/decoding, encryption/decryption, error detection and correction, bit stream translation, filtering, etc. A transceiver 508, generally coupled to an antenna 510, transmits the outgoing radio signals 512 and receives the incoming radio signals 514 associated with the wireless device.

The mobile computing arrangement 500 may also include an alternate data interface 516 coupled to the processor 502 and adapted for communicating over a local network. The alternate interface 516 may include any combination of wired or wireless physical data transmission hardware and protocols, such as Bluetooth, 802.11 wireless networking, Ethernet, Infrared Data Association (IRDA), etc. The circuitry of the alternate interface 516 may be integrated with the circuitry of the DSP 506 and transceiver 508, or may be separately provided. The alternate interface 516 may be integrated into the mobile arrangement 500 or may be provided as an add-on peripheral device.

The mobile computing arrangement 500 also includes user-interface 518 elements coupled to the processor 502. The user-interface 518 of the arrangement 500 may include, for example, a display 520 such as a liquid crystal display, a keypad 522, speaker 524, and microphone 526. Other user-interface mechanisms may also be employed, such as voice commands, switches, touch pad/screen, graphical user interface using a pointing device, trackball, joystick, or any other user interface mechanism. These and other user-interface components are coupled to the processor 502 as is known in the art.

The program storage/memory 504 contains software used to operate the mobile computing arrangement 500. This software may include a VPN client module 530 that allows the mobile computing arrangement 500 to securely connect to a local network via untrusted public networks. The VPN client module 530 may be coupled to communicate via both the transceiver 508 and the alternate data interface 516. The VPN client module 530 may include user interface functions that accept user configuration and connection actions via the user interface 518. The VPN client module 530 may include cryptographic and authentication functions internally, or may utilize these functions via other software module available on the mobile computing arrangement 500.

The program storage/memory 504 also contains a UPnP interface module 532. The UPnP interface module 532 allows connecting to and sharing data with elements of a UPnP network. Generally, interfacing with UPnP networks involves communicating using standard UPnP protocols, advertising services available via the mobile computing arrangement 500, and discovering and using advertised services of other devices. The UPnP interface module 532 may be enabled to communicate via the VPN client module 530 for secure communications. The UPnP interface module 532 may also be enabled to communicate directly through either or both of the transceiver 508 and the alternate data interface 516.

To utilize UPnP service provided, the storage/memory 504 of the mobile arrangement 500 may include UPnP control and data processing applications 534. These applications 534 may act as a "wrapper" for utilizing the services and/or for provided services on a UPnP network. The applications 534 may also be used for configuring other UPnP modules such as the VPN client module 530, if that module 530 is configured as a UPnP service or device.

The program storage/memory 504 contains a power saving module 536. The power saving module 536 may include facilities for controlling hardware and software in order to prolong battery life. These power saving facilities may be provided directly by the module 536, or in conjunction with other software and hardware of the arrangement 500 (e.g., operating system, BIOS, etc.). The power saving module 536 is also configured to provide power status and control communications via the UPnP data interface 532. The power saving module 536 may communicate signals or messages to UPnP network elements that indicate the current power state of the arrangement 500. The power saving module 536 may also receive power related signals or messages for purposes of changing power states (e.g., wake up signal). The power saving module 536 may also be configured to coordinate with a low power proxy (e.g., proxy 238 in FIG. 2) to control low power states that are presented on a UPnP network behalf of the mobile computing arrangement 500. The power saving module 536 may only communicate actual low power states on the local device, and may also coordinate simulated low-power states that are used by the low power proxy, for example, to reduce network bandwidth.

The mobile computing arrangement 500 of FIG. 5 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Figure 6:
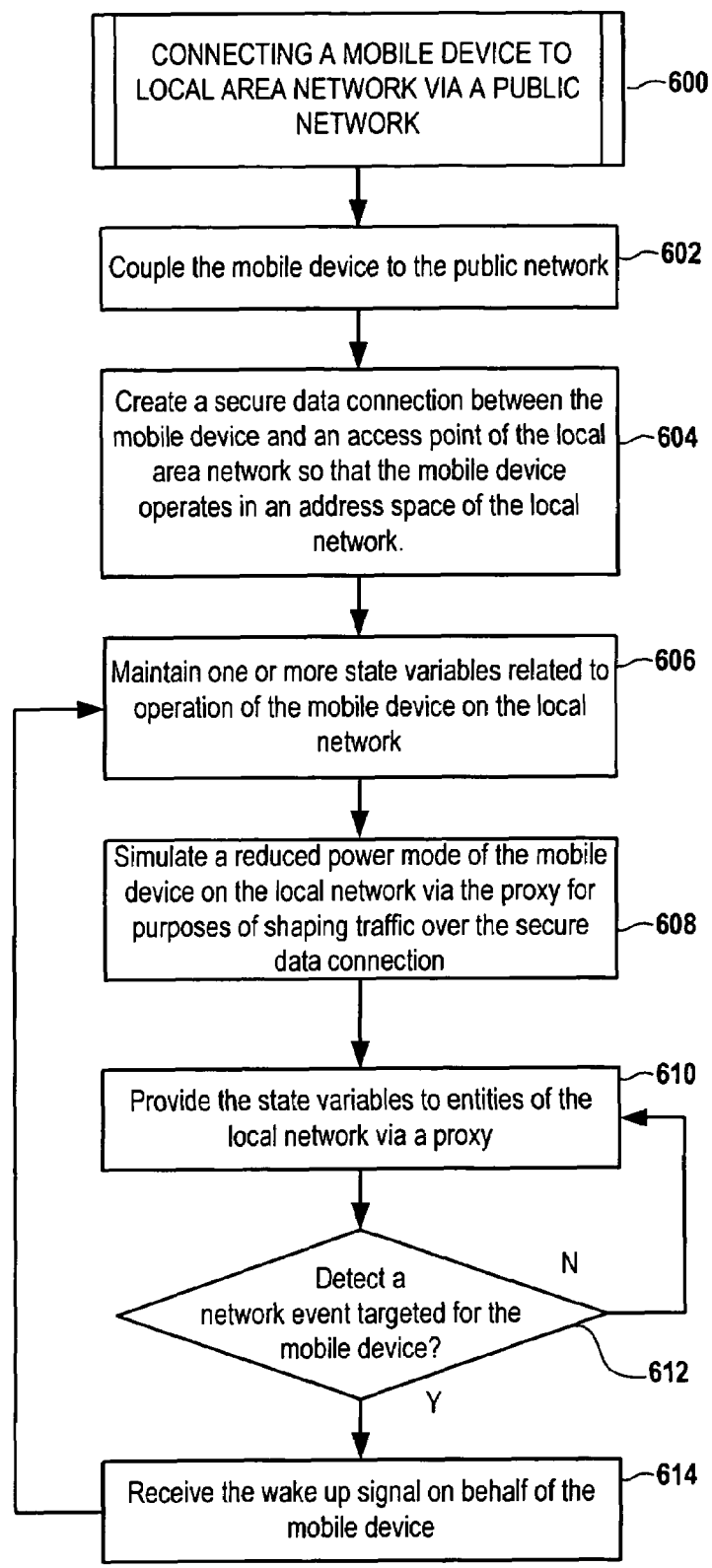
FIG. 6 illustrates a procedure for connecting a mobile device to local area network via a public network according to embodiments of the present invention.

Turning now to FIG. 6, a procedure 600 is illustrated for connecting a mobile device to an ad-hoc, peer-to-peer local area network via a public network according to embodiments of the present invention. Generally, the procedure involves coupling (602) a mobile device to a public network. A secure data connection is then created (604) between the mobile device and an access point of the local area network so that the mobile device operates in an address space of the local network. One or more state variables relating to operation of the mobile device on the local network are maintained (606) by a proxy of the local network. A reduced power mode of the mobile device is simulated (608) on the local network via the proxy for purposes of shaping traffic over the secure data connection. The state variables are generally provided (610) to entities of the local network via the proxy. If a network event targeted for the mobile device is detected (612), a wake up signal may be received (614) by the proxy on behalf of the mobile device.

Hardware, firmware, software or a combination thereof may be used to perform the various functions and operations described herein of a distributed-computation program. Articles of manufacture encompassing code to carry out functions associated with the present invention are intended to encompass a computer program that exists permanently or temporarily on any computer-usable medium or in any transmitting medium that transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a distributed-computation system, apparatus, and method in accordance with the present invention.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather defined by the claims appended hereto.

What is claimed is:

1. A method comprising:
   establishing a secure data connection between a mobile device coupled to a public network and an access point of a local area network so that the mobile device operates in an address space of the local network;
   operating a proxy for the mobile device on the local network, the proxy maintaining one or more state variables related to operation of the mobile device on the local network;
   simulating a reduced power mode of the mobile device on the local network via the proxy for purposes of shaping traffic over the secure data connection; and
   providing the state variables to entities of the local network via the proxy on behalf of the mobile device.

2. The method of claim 1, further comprising filtering, via the access point, multicast messages originating from the local network that are targeted for the mobile device.

3. The method of claim 1, further comprising, in response to a network event targeted for the mobile device, receiving a wake up signal at the proxy on behalf of the mobile device.

4. The method of claim 1, wherein creating the secure data connection comprises establishing a virtual private network between the mobile device and the access point of the local area network.

5. The method of claim 1, wherein providing the state variables to the entities of the local network comprises reserving an IP address of the local network on behalf of the mobile device.

6. The method of claim 5, wherein reserving the IP address of the local network for the mobile device comprises issuing an address resolution protocol (ARP) response on behalf the mobile device to reserve the IP address on an auto-configured IP network.

7. The method of claim 6, further comprising detecting an addressing mode of the local area network, and wherein the IP address is reserved for the mobile device only if the addressing mode includes IP auto-configure.

8. The method of claim 1, wherein the public network comprises a packet-switched radio network.

9. The method of claim 1, wherein the public network comprises the Internet.

10. An apparatus comprising:
    a first network interface capable of being coupled to an ad-hoc, peer-to-peer local area network;
    a second network interface capable of being coupled to a public network;
    a processor coupled to the first and second network interfaces that causes the apparatus to,
       establish a secure data connection between a mobile device coupled to the public network and the local area network so that the mobile device operates in an address space of the local network;
       simulate a reduced power mode of the mobile device on the local area network for purposes of shaping network traffic communicated via the secure data connection; and
       provide to entities of the local network one or more state variables related to operation of the mobile device on behalf of the mobile device.

11. The apparatus of claim 10, wherein the processor further causes the apparatus to filter multicast messages originating from the local network that are targeted for the mobile device.

12. The apparatus of claim 10, wherein the processor further causes the apparatus to, in response to a network event targeted for the mobile device, receive a wake up signal on behalf of the mobile device.

13. The apparatus of claim 10, wherein establishing the secure data connection comprises establishing a virtual private network between the mobile device and the computing arrangement.

14. The apparatus of claim 10, wherein providing the state variables to the entities of the local network comprises reserving an IP address of the local network on behalf of the mobile device.

15. The apparatus of claim 14, wherein reserving the IP address of the local network for the mobile device comprises issuing an address resolution protocol (ARP) response on behalf the mobile device to reserve the IP address on an auto-configured IP network.

16. The apparatus of claim 15, wherein the processor further causes the apparatus to detect an addressing mode of the local area network, and wherein the IP address is reserved for the mobile device only if the addressing mode includes IP auto-configure.

17. The apparatus of claim 10, wherein the public network comprises a packet-switched radio network.

18. The apparatus of claim 10, wherein the public network comprises the Internet.

19. A computer usable storage medium having instructions stored thereon which are executable by an apparatus capable of being coupled to an ad-hoc, peer-to-peer local area network and a public network, the instructions executable by the apparatus for performing:
    establishing, via the public network, a secure data connection between a mobile device coupled to the public network and the local area network so that the mobile device operates in an address space of the local network;
    simulating a reduced power mode of the mobile device on the local area network for purposes of shaping network traffic communicated via the secure data connection; and
    providing to entities of the local network one or more state variables related to operation of the mobile device on behalf of the mobile device.

20. The computer usable storage medium of claim 19, wherein the instructions are further executable for filtering multicast messages originating from the local network that are targeted for the mobile device.

21. The computer usable storage medium of claim 19, wherein the instructions are further executable for, in response to a network event targeted for the mobile device, receiving a wake up signal on behalf of the mobile device.

22. The computer usable storage medium of claim 19 wherein establishing the secure data connection comprises establishing a virtual private network between the mobile device and the data processing arrangement.

23. The computer usable storage medium of claim 19, wherein providing the state variables to the entities of the local network comprises reserving an IP address of the local network on behalf of the mobile device.

24. The computer usable storage medium of claim of claim 23, wherein reserving the IP address of the local network for the mobile device comprises issuing an address resolution protocol (ARP) response on behalf the mobile device to reserve the IP address on an auto-configured IP network.

25. The computer usable storage medium of claim 24, wherein the instructions are further executable for detecting an addressing mode of the local area network, and wherein the IP address is reserved for the mobile device only if the addressing mode includes IP auto-configure.

26. The computer usable storage medium of claim 19, wherein the public network comprises a packet-switched radio network.

27. The computer usable storage medium of claim 19, wherein the public network comprises the Internet.

28. An apparatus comprising:
a network interface capable of being coupled to a public network; and
a processor coupled to the network interface that causes the apparatus to,
   connect to an ad-hoc, local area network via a secure data connection operable over the public network;
   communicate with entities of the local area network via a proxy that simulates a reduced power mode of a mobile terminal on the local area network for purposes of shaping network traffic communicated via the secure data connection, wherein the proxy is capable of maintaining one or more state variables related to operation of the mobile terminal on the local network;
   enter a reduced power mode; and
   utilize the one or more state variables on the local network via the proxy after transitioning from the reduced power mode to a normal activity mode.

29. The apparatus of claim 28, wherein the processor further causes the apparatus to,
receive a wake up signal from the proxy; and
enter the normal activity mode in response to the wake up signal.

30. The apparatus of claim 28, wherein the secure data connection comprises a virtual private network.

31. The apparatus of claim 28, wherein the one or more state variables comprises an IP address of the local network.

32. The apparatus of claim 28, wherein the public network comprises a packet-switched radio network.

33. The apparatus of claim 28, wherein the public network comprises the Internet.

34. A computer-usable storage medium having instructions stored thereon which are executable by an apparatus capable of being coupled to a public network, the instructions executable by the apparatus for performing:
   connecting to an ad-hoc, local area network via a secure data connection operable over the public network;
   communicate with entities of the local area network via a low-power proxy that simulates a reduced power mode of the mobile terminal on the local area network for purposes of shaping network traffic communicated via the secure data connection, wherein the proxy is capable of maintaining one or more state variables related to operation of the mobile terminal on the local network;
   entering a reduced power mode; and
   utilizing the one or more state variables on the local network via the proxy after transitioning from the reduced power mode to a normal activity mode.

35. The computer-usable storage medium of claim 28, wherein the instructions are further executable for:
   receiving a wake up signal from the proxy; and
   entering the normal activity mode in response to the wake up signal.

36. A system comprising:
   a local area network configured to provide ad-hoc data exchanges between consumer electronics devices coupled to the local area network;
   a publicly accessible network;
   a mobile device capable of being coupled to the publicly accessible network;
   means for creating, via the public network, a secure data connection between the mobile device and the local area network so that the mobile device operates in an address space of the local network;
   means for maintaining one or more state variables related to operation of the mobile device on the local network;
   means for simulating a reduced power mode of the mobile device on the local network for purposes of shaping traffic over the secure data connection; and
   means for providing the state variables to entities of the local network on behalf of the mobile device.

37. The system of claim 36, further comprising means for filtering multicast messages originating from the local network and targeted for the mobile device.

38. The system of claim 36, further comprising means for sending from the access point a wake up signal to the mobile device in response to a network event targeted for the mobile device if the mobile device is in the reduced power mode.

* * * * *